July 18, 1950     M. F. WHITLOW ET AL     2,516,036
FISHING PLUG RETRIEVER
Filed Dec. 31, 1947
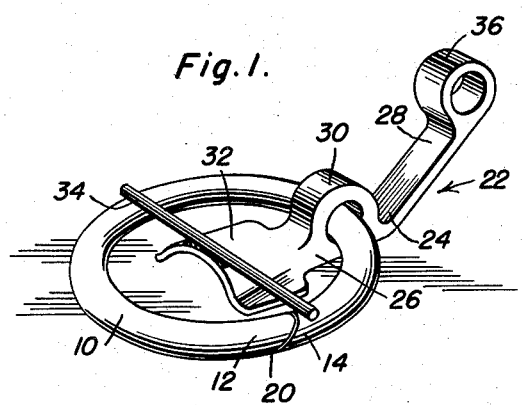
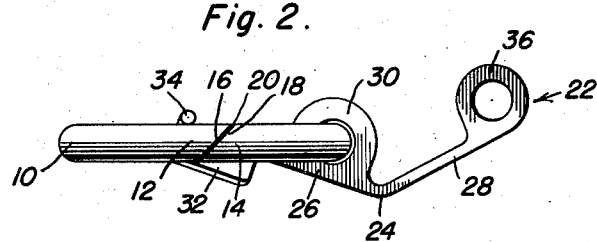
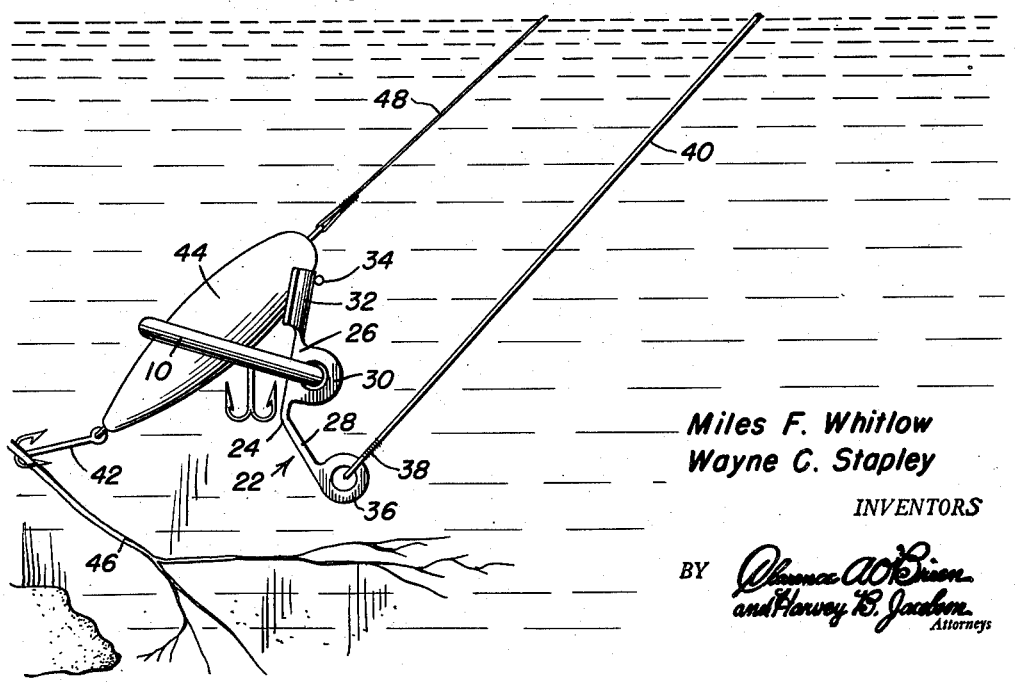
Miles F. Whitlow
Wayne C. Stapley
INVENTORS Patented July 18, 1950

2,516,036

UNITED STATES PATENT OFFICE 2,516,036

FISHING PLUG RETRIEVER

Miles F. Whitlow and Wayne C. Stapley, Chandler, Ariz.

Application December 31, 1947, Serial No. 794,986

3 Claims. (Cl. 43—17.2)

This invention relates to new and useful improvements in fishing plug retrievers and the primary object of the invention is to provide a plug retriever slidably mounted on a fishing line supporting a plug that is snagged, and including novel and improved means for actuating said plug to release the same from the article on which it is snagged.

Another object of the present invention is to provide a fishing plug retriever including a ring member, a pivotal lever carried by said ring member, and including novel and improved means for limiting the pivotal movement of said lever relative to said ring member.

A further object of the present invention is to provide a retriever for snagged fishing plugs and the like that is extremely small and compact in structure, facilitating the same to be conveniently carried or economically shipped.

A further aim of the present invention is to provide a device for retrieving fishing plugs that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the present fishing plug retriever;

Figure 2 is a side elevational view of Figure 1; and,

Figure 3 is a diagrammatic view showing the present invention in use.

Referring now to the drawings in detail, wherein for the purpose of illustration, there is disclosed a preferred embodiment of the present invention, the numeral 10 represents a split ring of any suitable material having its end portions 12 and 14 provided with opposed inclined faces 16 and 18 spaced to form an inclined opening 20.

The numeral 22 represents a substantially bell-crank lever generally, comprising a medial point 24 and outwardly diverging arms 26 and 28. Integrally formed with one of the arms, for example, arm 26, and adjacent the medial point 24, is a transverse bearing sleeve 30 that is pivotally and slidably mounted on the ring 10.

The free extremity of arm 26 is enlarged and terminates in a substantially concavo-convex bearing strip 32. Rigidly secured by welding or the like to the convex face of the strip 32, is an elongated stop bar 34 of a length slightly greater than the diameter of the ring 10, so that the bar 34 will limit the pivotal movement of the lever 22 relative to the ring 10.

Integrally formed at the outer extremity of arm 28, is a further sleeve or eye element 36 that fixedly engages one end 38 of an actuating line or cord 40.

In practical use of the device, when the hook 42 depending from a plug 44 is snagged or entangled with a root or the like 46, the line 48 engaging the plug 44, is slipped through opening 20 to remain within the ring 10. The faces 16 and 18 of the ends 12 and 14 are such as to prevent disengagement of the line 48 with the ring 10. The ring 10 is allowed to slide downwardly on the line 48 until the said ring loosely embraces the plug 44, as shown best in Figure 3 of the drawings. By pulling upwardly and downwardly or actuating the line 40, the bearing strip 32 will engage or bind against the outer periphery of the plug with deliberate force, thus actuating the plug so that the hook 42 will be disengaged with the snagged article 46.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention what is claimed as new is:

1. A fishing lure retriever comprising a split ring, a bell crank lever slidably and pivotally mounted on said ring, said bell crank lever having a concavo-convex bearing plate at one end, and a stop carried by the bearing plate limiting pivotal movement of said lever to said ring.

2. The combination of claim 1 wherein said stop includes an elongated bar disposed transversely of said lever and having its central portion fixed to the convex surface of said bearing plate.

3. A fishing lure retriever comprising a split ring having an inclined opening between its ends for receiving a line, a substantially V-shaped lever having inner and outer legs, an eye integrally formed with the free end of the outer leg for receiving an operating line, a further eye integrally formed with the inner leg intermediate the ends thereof and slidably receiving the ring, said further eye being loosely received on said ring for pivotal movement of the lever, said inner leg having a concavo-convex bearing portion for engaging the outer surface of a lure embraced by said ring, and a laterally projecting stop bar fixed to said bearing portion, said stop bar being of a length greater than the inside diameter of said ring to abut the outer top surface of the ring for limiting the pivotal movement of said lever during the lowering of the ring into a fluid medium by a line applied to the first mentioned eye.

MILES F. WHITLOW.
WAYNE C. STAPLEY.

REFERENCES CITED

The following references are of record in the file of this patent:

UNITED STATES PATENTS

| Number | Name | Date |
|---|---|---|
| 1,042,630 | Wetmore | Oct. 29, 1912 |
| 1,958,514 | Hope | May 15, 1934 |
| 2,175,757 | Metzler | Oct. 10, 1939 |